(12) United States Patent
Frank

(10) Patent No.: US 9,140,331 B2
(45) Date of Patent: Sep. 22, 2015

(54) WEBLESS PLANETARY GEAR SET

(75) Inventor: Hubertus Frank, Hoechstadt (DE)

(73) Assignee: IMO HOLDING GMBH, Gremsdorf (DE)

( * ) Notice: Subject to any disclaimer, the term of this patent is extended or adjusted under 35 U.S.C. 154(b) by 307 days.

(21) Appl. No.: 13/500,496

(22) PCT Filed: Sep. 30, 2010

(86) PCT No.: PCT/EP2010/005960
§ 371 (c)(1),
(2), (4) Date: Apr. 5, 2012

(87) PCT Pub. No.: WO2011/042131
PCT Pub. Date: Apr. 14, 2011

(65) Prior Publication Data
US 2012/0220418 A1    Aug. 30, 2012

(30) Foreign Application Priority Data

Oct. 6, 2009  (DE) .......................... 10 2009 048 429
Oct. 13, 2009 (DE) .......................... 10 2009 049 271

(51) Int. Cl.
*F16H 1/46* (2006.01)
*F16H 1/28* (2006.01)

(52) U.S. Cl.
CPC .......... *F16H 1/28* (2013.01); *F16H 2001/2881* (2013.01)

(58) Field of Classification Search
CPC ............................................. F16H 2001/2881
USPC .......... 475/338, 339, 340, 341, 342, 348, 334
See application file for complete search history.

(56) References Cited

U.S. PATENT DOCUMENTS

| 2,189,776 | A | * | 2/1940 | Bowen | 475/159 |
| 3,633,441 | A | * | 1/1972 | Hicks | 475/334 |
| 3,792,629 | A | * | 2/1974 | Applebury | 475/342 |
| 4,726,259 | A |   | 2/1988 | Idler | |
| 5,078,665 | A | * | 1/1992 | Castellani | 475/342 |

FOREIGN PATENT DOCUMENTS

| DE | 26 25 429 | 12/1977 |
| GB | 2 012 387 | 7/1979 |
| WO | WO 81/00899 | 4/1981 |
| WO | WO 2006/066985 | 6/2006 |

* cited by examiner

*Primary Examiner* — Robert Hodge
*Assistant Examiner* — Ryan Dodd
(74) *Attorney, Agent, or Firm* — Manabu Kanesaka

(57) ABSTRACT

The invention is directed to a Wolfrom-type, webless planetary gear set, comprised of two coaxial housing parts which are rotatable opposite each other with one each internal toothing on the applicable inner side, a toothed sun gear as well as several toothed planetary gears, which roll between the sun gear and the internal sets of teeth and are arranged in a floating manner. In other words, without further guidance on a planetary gear carrier or similar with a bearing arrangement between the two housing parts whose bearing bodies circulate around the paths which are located radially outside at least one internal toothing.

32 Claims, 1 Drawing Sheet

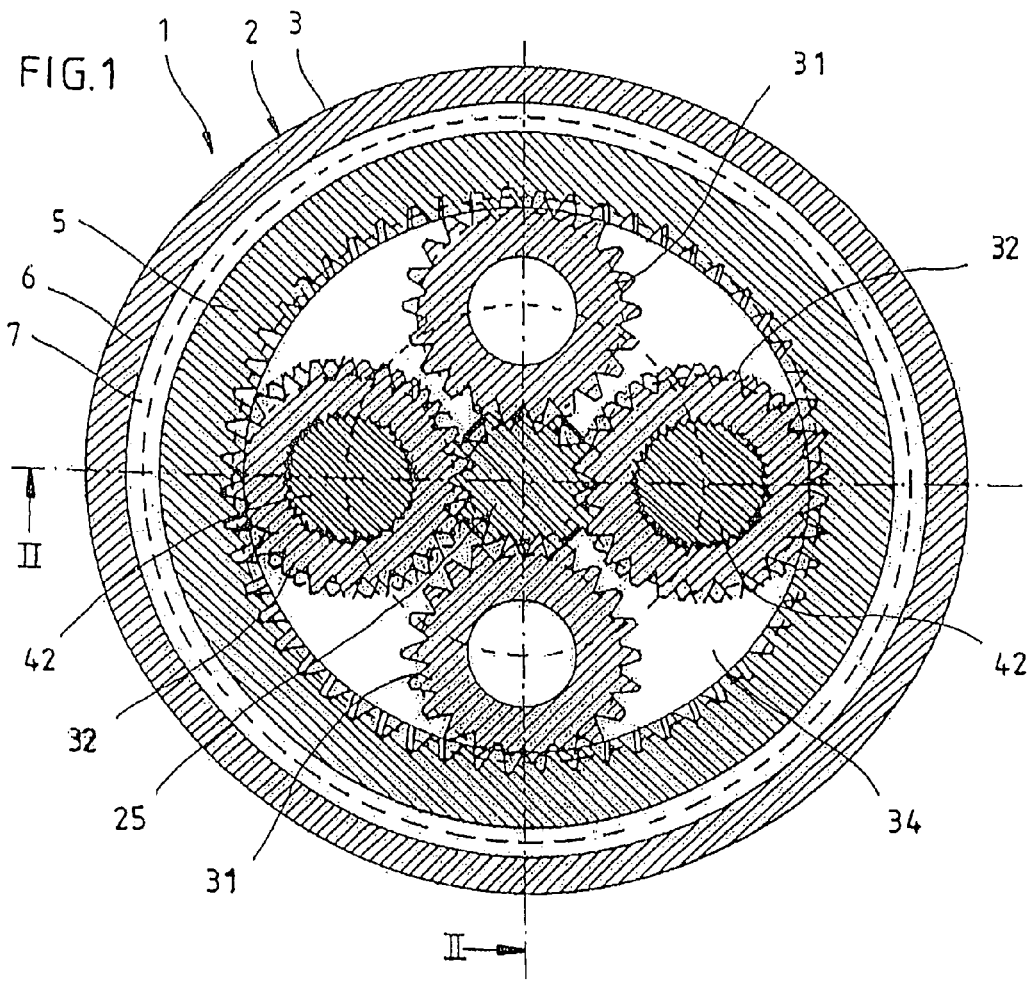
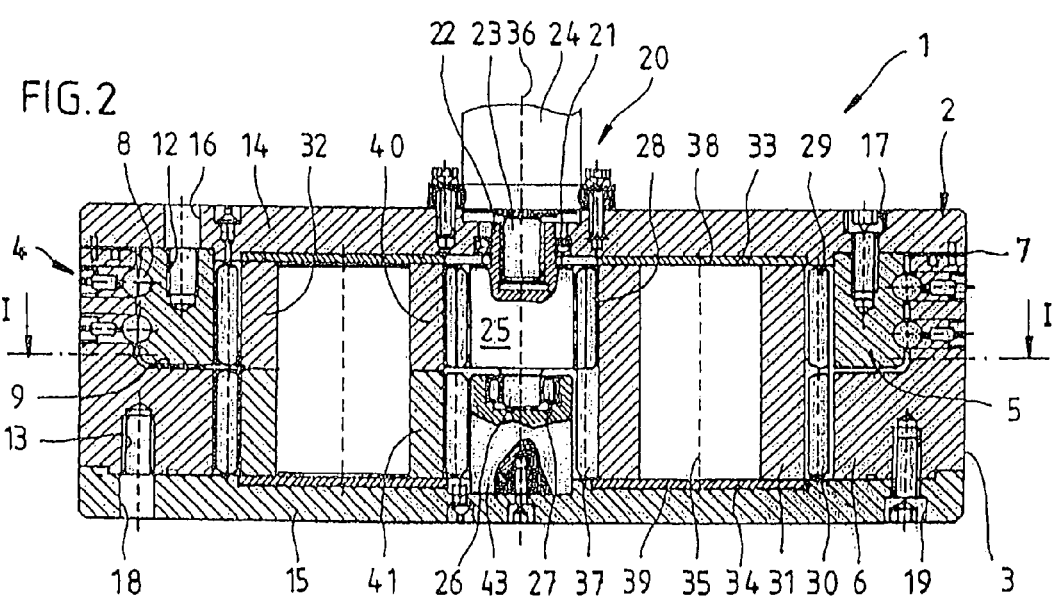

WEBLESS PLANETARY GEAR SET

RELATED APPLICATIONS

The present application is National Phase of International Application No. PCT/EP2010/005960 filed Sep. 30, 2010, and claims priority from German Application No. 10 2009 048 429.9, filed Oct. 6, 2009 and German Application No. 10 2009 049 271.2, filed Oct. 13, 2009.

The invention concerns a Wolfrom-type, webless planetary gear set for high gear transmission ratios, comprising two coaxial housing parts which can be rotated counter to each other, each with inner toothing on the respective inner side, a toothed sun gear and a plurality of planetary gears which roll between the sun gear and the inner toothing and are mounted in a floating manner, i.e., without further guidance of a web or planetary gear carrier, but instead their front sides glide along between two level, ring-shaped gliding surfaces which are parallel and located on the inner sides of the front faces of the two housing parts.

For an arrangement suitable for the type, see utility model pattern DE 93 18 360 U1. Large and small step down and gear transmission ratios can indeed be achieved with the compact gear set revealed there. A housing part is also revealed there which must be specified and must be able to rotate counter to its counterpart. However, there is no low-wear rotating arrangement between the two. At the most there is a friction-type gliding arrangement instead so that such a gear set can only have a short operating duration.

The patent application DE 42 24 850 A1 indicates a form of construction that is facing away from its counterpart. However, here there is only a single, specifiable housing with two connection shafts or hollow shafts and no two-part housing. These (hollow) shafts are mounted with low-friction bearing arrangements either on the housing or on eachother but radially close to the rotating axis in the areas that are opposite the planetary gears and axially staggered. This kind of arrangement requires an increased axial construction height of the gear set which is not desired in many applications.

The problem which initiated the invention resulted from the disadvantages of the described state of technology—of further developing the suitable planetary gear set in such a manner that a long operating life can be achieved so that it can, for example, be used like a rotary drive. A preferred application area should be the rotary drive of large system parts such as, for example, the swivel bearing of cranes, excavators, etc. whereby it is also necessary to control great axial forces and/or moments of tilt in addition to high torques.

This problem can be solved by placing a bearing arrangement between the two halves of the housing parts whose bearing bodies circle around orbits which are radially outside of at least one inner set of teeth, as well as at an axial height between the two house-side gliding surfaces to guide the planetary gears.

Since the bearing arrangement is located at the same axial height as the planetary gears and radially outside one of the inner threads surrounding this, the construction height of the gear set does not need to be increased. At the same time, the large radial distance of the bearing bodies to the rotation axis offers optimal conditions to also deflect large moments of tilt due to favorable leverage conditions. Moreover, with the enlarged radial distance of the bearing bodies, the scope there is relatively large so that comparatively many bearing bodies can already be arranged in a single row and they all will also be able to absorb very great axial forces and transfer these between the rings. The gear set offered by the invention is able to create extremely great gear transmission and step down ratios, for example, in the range of from 1:500 to approximately 1:1000. This means, on the one hand, extremely high torques can be used on comparatively small drive motors. And, on the other hand, the gear unit can be designed so that it has self-retarding properties and an additional brake may not be necessary.

By having the gear unit do without webs, i.e., planetary gear carrier, no web has to be installed within a cylinder surrounded by the bearing arrangement of the bearing body path(s) and thus the axial construction height is reduced to approximately the length of the planetary gears plus the two housing fronts. At the same time, while controlling enormous axial and radial forces and moments of tilt, a bearing arrangement offers a much longer operating time in comparison to a glide arrangement between the parts of the housing. If both parts of the housing each have at least some level, inner front faces between which the planetary gears are guided, each of the planetary gears are in contact with the front faces on one inner front side of both housing parts, whereby, however, the relative planetary speeds of the planetary gears are different in comparison to both housing parts so that different gliding speeds can be found on the two faces of one planetary gear. If desired, the gliding areas can be formed themselves by the housing face plates, whereby it is recommended to smooth same, or to polish them, or special coatings or inserts can be provided, made, for example, from Teflon or another smooth material which is also wear-proof at the same time.

It has proven to be advantageous that at least one housing part—preferably both housing parts—has/have a shape like a pot or bowl with a approximately level front face and an approximately cylindrical coating surface next to its outside edge. On the one hand, such a housing unit serves as the connection to a foundation, chassis or other system or machine part and, on the other hand, it can already take over the function of a hollow gear as with a planetary gear.

On the other hand, at least one housing part can have a cover-like design with a circumferential guard radially shifted inwards opposite its outer edge. Such a configuration is particularly suitable for the combination with a previously described pot or bowl-shaped household object namely such an object that the guard is immersed completely or partially in the pot or bowl-shaped housing part.

A preferred further development of the invention consists of the fact that at least one of the two housing parts which can be rotated counter to each other, preferably both, have a level front face for the connection to a foundation, chassis or other machine or system part. Normally such a connection part is pressed onto the machine or system part to be connected over a large surface and frictionally engaged, whereby the gear unit is directed to the applicable machine or system part at the same time.

An advantageous construction regulation states that one or preferably both connection surfaces have bored holes arranged around the rotation axis, preferably with blind bored holes with inner threading for the purpose of the positioning on a machine or system part. The screws therein press the applicable housing part firmly against a foundation, chassis, machine or system part.

It has proven to be advantageous that the bored holes, in particular pocket holes, on both connection surfaces each of which have different radial distances from the rotation axis. This feature corresponds to a form of design with a pot-shaped housing part and a cover-shaped housing part with a guard which is radially shifted inward. Such cases can be worked into the blind holes on the guard, on the one hand, and in these outer surrounding coating surfaces, on the other hand.

The two housing parts which can be rotated counter to each other should seal each other, for example, with a sealing ring which is specified on a housing part and whose sealing lip is elastically pressed onto the other housing part.

An arrangement offers additional advantages, whereby the bearing arrangement has two rings which can be rotated counter to each other, between which the bearing bodies roll. For this purpose, one or more paths can be provided in each ring to guide the bearing bodies rolling therein. These paths can be integrated directly in the applicable basic ring body.

Such a kind of execution can be further formed in this respect by having the rings which can be rotated counter to each other each create one part of a housing shell so that a plurality of functions are united together in one component—connection or specification to a machine or system part; protection from damages and penetrating foreign particles; holding back the lubricants filled therein, preferably grease, but sometimes also oil; stiffening of the housing; rotating arrangement; inner toothed hollow gear.

It is within the scope of the invention that the rings of the bearing arrangement which can be rotated counter to each other are integrated or connected with, in particular screwed to a front-sided side plate. This plate is preferably used for holding or guiding the movable parts of the housing.

The bearing arrangement is preferred between the two rings or housing parts which can be rotated against each other and which are designed like a radial bearing such that they can absorb radial forces, axial forces and moments of tilt.

It has proven to be advantageous to design the bearing arrangement between the two rings which can be rotated counter to each other or housing parts in one or more rows. Regarding the multiple-row form of design, the carrying force can be increased, where appropriate, with a smaller cross section of the bearing bodies.

Depending on the design form, the bearing arrangement between the two rings which can be rotated counter to each other or housing parts can have one or more balls. The balls have a double convex surface and are, together with the cross sectional somewhat complementary designed concave curved paths, are able to absorb both radial and axial forces and moments of tilt and transfer them from one ring to another. When several rows of bearing bodies are used, it is also possible that the bearing bodies form one or more rows as rolls.

At least one housing part should have a closed front side, in particular without through passing or exit on a drive shaft or a driven shaft. This means that the penetration at this point of foreign particles into the housing is impossible even during rough operation.

Another feature of the invention is that the rings which can be rotated against each other or housing parts each have inner toothing. This makes them into a functional part of the gear unit. Preferably, the paths of the bearing bodies of the bearing arrangement and the inner teeth of the applicable ring are created by processing or shaping of said ring or connection element of the basic body.

Regarding an alternate embodiment, an additional ring can be set on the inner side on at least one of the two rings which can be rotated against each other or housing parts which additional ring has inner toothing. This additional, inner toothed ring can be fixed on the outer ring with screws, for example.

With these embodiments, the inner sets of teeth on the two rings which can be rotated against each other or housing parts can have identical or almost identical pitch circle diameters.

Furthermore, the invention is characterized in that between the number of teeth $z_{H1}$, $z_{H2}$ of the inner sets of teeth of the two housing parts, there exists a difference in the number of teeth $\Delta z = |z_{H1} - z_{H2}| \geq 1$:

$$\Delta z = |z_{H1} - z_{H2}| \geq 1.$$

This difference in the number of teeth causes a slight relative twist between the two rings during circling of the planetary gears.

Preferably, the difference in the number of teeth $\Delta z = |z_{H1} - z_{H2}|$ between the number of teeth $z_{H1}$, $z_{H2}$ of the inner sets of teeth of both parts of the housing is equal to or less than the number p of the planetary gears, particularly the number of planetary gears engaged:

$$\Delta z = |z_{H1} - z_{H2}| \leq p.$$

Particularly simple relationships are created in this regard when the difference in the number of teeth $\Delta z$ is equal to the number p of the planetary gears:

$$\Delta z = |z_{H1} - z_{H2}| = p,$$

since the teeth of the inner sets of teeth are aligned in the area of each planetary gear with each other on the two rings and planetary gears with continuous toothing can be used which simultaneously mesh with the two inner sets of teeth. On the other hand, the difference in the number of teeth $\Delta z$ should be kept as small as possible so that the gear transmission ratio or step down ratio will be particularly large. Due to these relationships, the area specified above $1 \leq \Delta z \leq p$ is particularly relevant.

In the most general of cases, the sets of teeth on the inner sides of the 2 housing parts should have different quotients from the pitch circle diameter d and scaling interval p:

$$\Delta(d/\rho) = |d_{H1}/\rho_{H1} - d_{H2}/\rho_{H2}| > 0$$

A gear transmission ratio could have been achieved both with a different tooth scaling or different modules and also different pitch circle diameters. Thus the sets of teeth on the inner sides of both housing parts can be differentiated from each other regarding their pitch circle diameter $d_{H1}$, $d_{H2}$ and/or regarding their scaling $\rho_{H1}$, $\rho_{H2}$ so that the following in equation is fulfilled:

$$1/\pi \leq \Delta(d/\rho) = |d_{H1}/\rho_{H1} - d_{H2}/\rho_{H2}| \leq p/\pi$$

With this preferred form of embodiment, the sets of teeth on the inner sides of both housing parts have the same pitch circle diameter d while their scalings $\rho_{H1}$, $\rho_{H2}$ differ from each other:

$$\Delta d = d_{H1} - d_{H2} = 0;$$

$$\rho_{H1}/(p^*|z_{H1}-p|) \leq \Delta \rho = |\rho_{H1} - \rho_{H2}| \leq \rho_{H1}/|z_{H1}-1|.$$

At the same time, the difference in scaling between the two inner sets of teeth should not be all that great so that planetary gears are able to roll easily with continuously constant toothing and not come into either of the two inner sets of teeth.

To avoid unbalance due to circulating planetary gears, the number n of the planetary gears should be two or more, preferably three or more, in particular four or more.

Due to similar considerations, two adjacent planetary gears of a total of n planetary gears should be staggered against each other by $360°/n$ so that a symmetrical arrangement results even dynamically.

Furthermore, in accordance with the invention it is provided that the axes of all planetary gears run parallel to each other so that the pitch circle diameters of the meshing toothing is constant over the entire, active length of a component and the sets of teeth are able to roll easily into each other.

The invention recommends that all planetary gears be restricted by cylindrical coating areas into which the toothing is integrated or molded. In this connection, this is a conscious turning away from other geometries such as, for example, ball-shaped or conical or barrel-shaped gear teeth which have less favorable properties for the invention described here.

Special advantages result from the fact that at least one planetary gear has a concentric bored hole on its rotation axis, in particular a through bored hole. This can save weight, among other things.

To the extent that the inner diameter of the bored hole, in particular a through bored hole, is measured in such a way in a planetary gear that the remaining wall thickness of the toothed foot to the inner bored hole is equal to or less than the triple tooth module, preferably equal to or less than twice the tooth module, in particular equal to or less than the single tooth module, so that such a jacket-like planetary gear has a comparatively strong elasticity and can easily change shape elastically if necessary.

To the extent—as the invention also provides—that a planetary gear is slightly over-dimensioned, it is easy for it to deform, whereby an absolutely precision-fitted transfer of the load is possible when the gear meshes with the sun gear, on the one hand, and, on the other hand, is forced into inner toothing.

The construction can be further simplified by having at least one planetary gear have continuous toothing between both its front faces. Such a planetary gear depends on the necessity that the teeth of inner sets of teeth of both rings are fairly aligned with each other in their meshing area.

The invention is further optimized by the fact that at least one planetary gear has toothing which is separated diagonally to its longitudinal axis and twisted azimuthally against each other. Such a planetary gear can also be placed at those locations where the inner sets of teeth of both rings are not aligned with each other.

In view of the small differences in the number of teeth between the two inner sets of teeth, it is possible that both sets of teeth of a planetary gear that are twisted counter to each other can have the same number of teeth.

Planetary gears with toothing which are twisted against each other can be implemented by arranging the two sets of teeth of a planetary gear which are twisted against each other on separate gears which are inserted on a common shaft, in particular a spline shaft. When the planetary gears have surface structure on their inner side which is complementary to the spline shaft, they can be inserted form-fittingly on any shaft, whereby, once the position of rotation is specified, it must be retained permanently. A relative twist of the toothing sections of both connected (partial) gears can be achieved, on the one hand, by keeping the inner surface structure of both gears opposite each other or twisted, or by giving the surface structure a finer, azimuthally scaling than the toothing on the exterior side, in particular, four times as much, so that the gears can be installed in different directions of rotation on a common shaft, in particular on a spline shaft, whereby two "adjacent" rotating positions differ from each other by less than one tooth scaling on the exterior side, for example, by one half, one third or one fourth of the latter.

The inner friction of the gear unit can be minimized by having the toothing of the sun gear have a shorter axial length than the planetary gears, in particular about half of the axial length of the latter; in particular when scaled planetary gears are used, this avoids pinching.

A possible arrangement for the sun gear is offered on or in at least one front face of the housing.

Finally, it corresponds to the calibration of the invention that the sun gear has one connection at least that is accessible through at least one front face side of the housing. To this connection, preferably a drive motor can be coupled, which does not have to comprise brakes under normal conditions because the gear unit provided by the invention is generally self-retarding, in other words, even with a pulling load between the two connection rings, the gear unit does not move itself, even when no braking torque is generated on the third connection.

Further features, details, advantages and effects based on the invention result from the following description of a preferred embodiment of the invention as well as based on the drawing. Hereby shows FIG. 1 a cross section through a drive in accordance with the invention, approximately along the line I-I in FIG. 2; as well as FIG. 2 a section through FIG. 1 along the line II-II.

A gear unit 1 according to the invention is designed for rough conditions and for extreme stress but, at the same time, is very compact. It has a cylindrical housing 2 which surrounds all movable parts.

In addition, this is not just a pure gear unit but also a rotary connection which is able to transmit axial and radial forces and moments of tilt between two connection elements. This is achieved by a bearing arrangement 4 located in the area of the outer perimeter 3 of the housing 2.

This bearing arrangement 4 is comprised of two concentric rings 5, 6 at a slight distance from each other so that the remaining gap 7 between rings 5, 6 permits smooth rotation between the two rings 5, 6.

Several bearing bodies, in this example two rows of bearing bodies, in particular of balls 8, are located in gap 7 between the two rings 5, 6.

As FIG. 2 indicates, the two rings 5, 6 have different designs. Radially within the ball row 8, ring 5 has a somewhat square cross section while ring 6 is radially outside the ball row 8 and has an approximately L-shaped cross section with a circumferentially running recess 9 on its inner side to receive the inner ring 5, whereby the cross section of the recess 9 is somewhat larger than the cross section of the ring 5 contained therein. The paths for the balls 8 are integrated or molded in the outer coat 10 of the inner ring 5, on the one hand, and in the inner coat 11 of the approximately parallel axis "guard" on the outer ring 6. Due to this arrangement, the bearing arrangement 4 has the properties of a radial bearing which can take and transmit radial and axial forces as well as moments of tilting.

A plurality of bored holes 12, 13 with inner threading, in particular blind bored holes, are arranged like a collar around the level front faces of the two rings 5, 6 which are turned away from each other.

Some of these bored holes 12, 13 are used for the screw connection of the applicable ring 5, 6 with one each front face housing conclusion plate 14, 15. Each of the two housing conclusion plates 14, 15 has aligning bored holes 16, 17, 18, 19 with the bored holes 12, 13 of the applicable rings 5, 6. There are bored holes 16, 17, 18, 19 with different cross sections: While the bored holes 17, 19 have a step-like design tapering down to the applicable ring 5, 6 and are used to hold housing screws 20, 21, the other bored holes 16, 18 are straight and are used as through passageways for screws for the connection of a housing part 5, 14 or 6, 15 with one each machine or system part which are not shown. Since these through passageway bored holes 16, 18 do not have threading, they also cannot absorb forces; the friction-locked connection is actually created by the rings 5, 6 which are fixed with screws or similar to a machine or system part and thus squeeze the applicable housing conclusion plate 14, 15 in between.

Consequently, this creates one ring 5, 6 each including the specified housing conclusion plate 14, 15, and each of the two housing components which can be twisted counter to each other. In general, one of these is connected to a foundation, chassis or similar and the other to a machine or system part which can be counter-rotated. This means that a certain position is assigned to the latter due to bearing arrangement 4 and the only remaining freedom is a rotation around the axis of the bearing arrangement 4.

To be able to specify the position of rotation, a third connection 20 is provided. This is located concentrically to the rings 5, 6 and is preferably located in the center of a housing covering plate 14, 15, in the center of the upper housing covering plate 14 in the example that is shown. Using a bearing arrangement that is located on this plate 14, in particular a ball bearing 21, a socket 22 is located there which can be rotated concentrically to the axis of rotation of the bearing arrangement 4. For example, a drive shaft 23 of a drive motor 24 can act in this socket which drive motor can be attached to the housing covering plate 14 with a flange as shown in FIG. 2. A groove-spring connection between the motor power-down shaft 23 and the socket 22 provides for a form fitting and thus a slip-free transmission of force from motor 24 to socket 22.

The socket 22 continues within the housing 2 in the form of a toothed sun gear 25. The axial extension of the sun gear 25 is shorter than the distance between the two housing conclusion plates 14, 15 or, for example, about half as large. To support the sun gear, this may comprise a trunnion 26, for example molded on its front face side opposite the socket, which, in turn, is—for example by means of an additional bearing arrangement 27—rotatably held at a particularly cylindrically or somewhat pot-shaped bearing body 43 connected or screwed to the opposite housing conclusion plate 15.

The sun gear 25 preferably has straight toothing 28 with $z_s$ teeth. Inner toothing 29 with the same module and the same tooth form is located on the inner side of at least this ring 5, whose coating surface is located at the same height as the toothing 28 of the sun gear; this toothing 29 comprises $z_{H1}$ teeth.

A coating surface located inside of the other ring 6 is located on an inner toothing 30. This differs from the toothing 29 on the other ring, particularly in the number $z_{H2}$ of teeth:

$$z_{H1} \neq z_{H2},$$

whereby, however, the tooth difference $\Delta z = |z_{H1} - z_{H2}|$ is relatively small. Ideally it is only 1.

In the roughly ring-shaped area between the two rings 5, 6, both the housing conclusion plates 14, 15 and the sun gear there are several planetary gears 31, 32 running in a circle, in particular distributed at equidistant distances over the circumference.

The planetary gears 31, 32 are arranged without any planetary gear carriers or web and thus can extend in the axis parallel direction from one housing conclusion plate 14 to the other 15; however, one gliding arrangement 33, 34 can be located between each, or from one smooth but durable and thus wear-proof material such as, for example, Teflon. These gliding arrangements 33, 34 then serve as guide paths for the planetary gears 31, 32 and ensure that their longitudinal axes are always 35 parallel to the rotation axis 36 of the gear housing 2. The planetary gears 31, 32 are dimensioned in such a manner that rolling with a slight play or are even free of play between the sun gear 25 and that of this appropriate inner toothing 29 is possible. They have the same tooth module as the sun gear 25 and the internal toothing 29. Due to this total arrangement, the planetary gears run around this during a rotation of the sun gear 25 and, during this, shift along the internal toothing 29.

Thereby, they are in geared meshing with the additional internal toothing 30 on the second ring 6, whereby the planetary gears 31, 32 in their geared area with the inner toothing 30 have the same number of teeth $z_p$ as in the geared area on the first ring 5 with the inner toothing 29. After they have shifted once around the partial circular scope of the inner toothing 29 of the (for example, on a foundation or chassis) specified ring 5 or along its $Z_{H1}$ teeth, they have also rolled over the second ring 6 $Z_{H1}$. However, since this has $z_{H2}$ teeth, it must twist around the first ring 5 by $\Delta z = |z_{H1} - z_{H2}|$ teeth during this time, in other words, by the small difference in the number of teeth. This results in an extremely strong step-down ratio of the sun gear 25 or a drive 24 meshing therein which is also used as ring 6 (or ring 5 if ring 6 is specified on a foundation or similar) which is used as a power down as, for example, of approximately 500:1 to approximately 1000:1. In turn this strong step down ratio has the often desired effect that the drive is self-restricting. In other words, a pulling or rotating load on a ring 5,6 is not able to set the unbraked motor 24 into a rotating movement.

As the drawing shows, there are generally two types of planetary gears: The one planetary gear 31 is unscaled (cf. FIG. 2 to the right) and its toothing 37 extends between both front face sides 38, 39 all the way through without every step. In addition, planetary gears 32 exist (cf. FIG. 2, to the left) which are subdivided in an upper section 40 and in a lower section 41. Although both sections 40, 41 are toothed, in particular also with the same module or the same number of teeth $z_p$ and form; however, the teeth of the two sections 40, 41 do not align with each other and, instead, are twisted slightly against each other. The separation between the two sections 40, 41 is located at a height of the opening of gap 7 between the two sets of inner teeth 29, 30 so that each section 40, 41 meshes with only exactly one internal toothing 29 or 30 and this prevents sticking. However, the two sections 40, 41 have a rotation-proof connection with each other, which can happen, for example, when each toothing section 40, 41 is ring-shaped in form with fine toothing on the inside which has a multiple, for example, twice the number of teeth $z_{P1}$ as the teeth $z_p$ on the outer toothing on one of the sections 40, 41:

$$z_{Pi} = n^* z_P, \text{ with } k=2,3,4\ldots$$

Both toothing sections 40, 41 are thus inserted, twist-proof, on a common multi-key shaft 42 or similar, however, opposite each other by one or more teeth, although by less than k teeth twisted against each other so that the teeth of the toothing areas 40, 41 do not align with each other.

Scaled planetary gears 32 are required in particular when the number of planetary gears 31, 32 does not agree with the difference in the number of teeth $\Delta z = |z_{H1} - z_{H2}|$ of the inner sets of teeth 29, 30.

In case that $n = \Delta z$, scaled planetary gears 32 can be done without. In particular, with such an embodiment, the possibility exists to develop the unscaled planetary gears 31 as thin sleeves, whereby the coating thickness is approximately the width of one tooth. This gives the planetary gears 31 a certain elasticity and they can be manufactured with slightly larger dimensions so that they can be used under tension in the hollow gear area. Due to this tension, all planetary gears 31 mesh simultaneously and, ideally, the gear unit has complete freedom of play.

| Reference Designation List |
| --- |
| 1 Gear unit |
| 2 Housing |
| 3 Scope |
| 4 Bearing arrangement |
| 5 Inner ring |
| 6 Outer ring |
| 7 Gap |
| 8 Balls |
| 9 Recess |
| 10 Outer coating surface |
| 11 Inner coating surface |
| 12 Bored hole |
| 13 Bored hole |
| 14 Housing conclusion plate |
| 15 Housing conclusion plate |
| 16 Bored hole |
| 17 Bored hole |
| 18 Bored hole |
| 19 Bored hole |
| 20 Connection |
| 21 Ball bearing |
| 22 Socket |
| 23 Power-down shaft |
| 24 Drive motor |
| 25 Sun gear |
| 26 Cone |
| 27 Bearing |
| 28 Toothing |
| 29 Inner toothing |
| 30 Inner toothing |
| 31 Planetary gear |
| 32 Planetary gear |
| 33 Gliding layer |
| 34 Gliding layer |
| 35 Longitudinal axis |
| 36 Rotation axis |
| 37 Toothing |
| 38 Front face side |
| 39 Front face side |
| 40 Section |
| 41 Section |
| 42 Splined shaft |
| 43 Bearing body |

The invention claimed is:

1. A Wolfrom-type, webless planetary gear set, comprising:

two coaxial housing parts which can be rotated relative to each other each with inner toothing on a respective inner side, a toothed sun gear and a plurality of toothed planetary gears which roll between the sun gear and the inner sets of teeth and are flying in a floating manner, without a planetary gear carrier but instead their front sides slide along between two level, parallel, ring-shaped gliding surfaces which are located on inner sides of front faces of the two housing parts comprising an bearing arrangement between the two housing parts having bearing bodies that circulate along paths which:

a) are located radially outside at least one of the inner sets of teeth as well as b) at an axial height between the two gliding surfaces of the housing for guidance of the planetary gears, wherein the sun gear c) exhibits an axial extension, which is shorter than a distance between both casing endplates, and d) is supported by a bearing system at another bearing body, which is located at a face opposite to a connection for a drive motor and which is connected to an opposite casing endplate.

2. The planetary gear set as defined in claim 1, wherein at least one of the housing parts has a pot or bowl-shaped design.

3. The planetary gear set as defined in claim 1, wherein at least one of the housing parts has a cover-like design with a flashing running around a circumference, and the flashing is displaced radially to an inside relative to an edge of the housing parts.

4. The planetary gear set as defined in claim 1, wherein one or both of the two housing parts which can be rotated relative to each other have one level front face for a connection to a foundation, chassis or another machine or system part.

5. The planetary gear set as defined in claim 4, wherein one or both connection surfaces have bored holes or blind bored holes provided with an internal threading, arranged distributed in a ring around a rotation axis for positioning on a fundament, chassis or on any other machine or system part.

6. The planetary gear set as defined in claim 1, wherein the bearing arrangement has two rings which can be rotated against each other, between which the bearing arrangement rolls along.

7. The planetary gear set as defined in claim 6, wherein the rings which can be rotated against each other, each create a part of a housing shell.

8. The planetary gear set as defined in claim 6, wherein the rings of the bearing arrangement, which can be rotated against each other, are integrated with or connected to or screwed to one front plate each.

9. The planetary gear set as defined in claim 1, wherein the bearing arrangement between two rings which can be rotated against each other or the housing parts is are designed as a radial bearing.

10. The planetary gear set as defined in claim 1, wherein the bearing arrangement between two rings which can be rotated against each other or the housing parts have one or more ball and/or roll bearing rows.

11. The planetary gear set as defined in claim 1, wherein at least one of the housing parts has a closed front face, without through passing or exit of a drive or power-down shaft.

12. The planetary gear set (1) as defined in claim 1, wherein one or both of rings or the housing parts which can be rotated against each other, have the inner toothing.

13. The planetary gear set as defined in claim 1, wherein an additional ring is located on an inner side of at least one of the two rings which can be rotated against each other or the housing parts, and the additional ring has the inner toothing.

14. The planetary gear set as defined in claim 12, wherein the inner sets of teeth on the rings which can be rotated against each other or the housing parts have identical or nearly identical pitch circle diameters.

15. The planetary gear set as defined in claim 12, wherein a difference in the number of teeth $z_{H1}$, $z_{H2}$ exists between the numbers of teeth $z_{H1}$, $z_{H2}$ of the inner sets of teeth of the two housing parts:

$$\Delta z = |z_{H1} - z_{H2}| \geq 1.$$

16. The planetary gear set as defined in claim 15, wherein the difference in the number of teeth $\Delta z = |z_{H1} - z_{H2}|$ between the numbers of teeth $z_{H1}$, $z_{H2}$ of the inner sets of teeth of the two housing parts is equal to or less than the number p of the planetary gears, the number of planetary gears that are meshing:

$$\Delta z = |z_{H1} - z_{H2}| \leq p.$$

17. The planetary gear set as defined in claim 12, wherein the toothing on the inner sides of both of the housing parts have different quotients from pitch circle diameter d and scaling p:

$$\Delta(d/\rho) = |d_{H1}/\rho_{H1} - d_{H2}/\rho_{H2}| > 0.$$

18. The planetary gear set as defined in claim 12, wherein the toothing on the inner sides of the two housing parts are different from each other regarding their pitch circle diameter $d_{H1}$, $d_{H2}$ and/or regarding their scaling $P_{H1}$, $P_{H2}$ so that the following inequality is fulfilled:

$1/\pi \leq \Delta(d/\rho) = |d_{H1}/\rho_{H1} - d_{H2}/\rho_{H2}| \leq p/\pi$.

19. The planetary gear set as defined in claim 12, wherein the sets of teeth on the inner sides of the two housing parts have the same pitch circle diameter d while their scalings $P_{H1}$, $P_{H2}$ differ from each other:

$\Delta d = d_{H1} - d_{H2} = 0$;

$\rho_{H1}/(p*|z_{H1}-p|) \leq \Delta\rho = |\rho_{H1} - \rho_{H2}| \leq \rho_{H1}/|z_{H1}-1|$.

20. The planetary gear set as defined in claim 1, wherein the number n of the planetary gears is two or more, or is three or more, or is four or more.

21. The planetary gear set as defined in claim 1, wherein two adjacent of a total of n planetary gears are displaced by 360°/n against each other.

22. The planetary gear set as defined in claim 1, wherein axes of all planetary gears run parallel to each other.

23. The planetary gear set as defined in claim 1, wherein all planetary gears are limited by cylindrical coating surfaces in which a toothing is integrated or molded.

24. The planetary gear set as defined in claim 1, wherein at least one of the planetary gears has a concentric recess along its longitudinal axis.

25. The planetary gear set as defined in claim 24, wherein an inner diameter of the recess in the planetary gears that is designed in such a manner that the remaining wall strength from a tooth foot to an inner bored hole is equal to or less than three times a tooth module of the planetary gears, or is equal to or less than twice the tooth module, or is equal to or less than a single tooth module.

26. The planetary gear set as defined in claim 1, wherein the planetary gears are manufactured with slightly larger dimensions so that, on the one hand, the planetary gears mesh in the sun gear and, on the other hand, the inner toothing is forced to deform slightly.

27. The planetary gear set as defined in claim 1, wherein at least one of the planetary gears has continuous toothing between its two front sides.

28. The planetary gear set as defined in claim 1, wherein at least one of the planetary gears is scaled crosswise to its longitudinal axis and has toothing sections which are rotated against each other in azimuthal direction.

29. The planetary gear set as defined in claim 28, wherein the toothing sections of the at least one of the planetary gears which are rotated relative to each other have the same number of teeth $z_p$.

30. The planetary gear set as defined in claim 28, wherein the toothing sections of the at least one of the planetary gears which are rotated relative to each other are arranged on separate gears which are inserted on a common shaft.

31. The planetary gear set as defined in claim 1, wherein a toothing of the sun gear has a shorter axial length than a length of the planetary gears.

32. The planetary gear set as defined in claim 1, wherein a toothing of the sun gear has an axial length which is about half an axial length of at least one of the planetary gears.

\* \* \* \* \*